(12) United States Patent
Wafzig et al.

(10) Patent No.: US 10,995,825 B2
(45) Date of Patent: May 4, 2021

(54) AUTOMATIC TRANSMISSION OF A VEHICLE, COMPRISING A CENTRAL SYNCHRONIZING DEVICE, AND METHOD FOR OPERATING AN AUTOMATIC TRANSMISSION

(71) Applicant: ZF Friedrichshafen AG, Friedrichshafen (DE)

(72) Inventors: Jürgen Wafzig, Bermatingen (DE); Matthias Reisch, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 769 days.

(21) Appl. No.: 15/736,122

(22) PCT Filed: May 19, 2016

(86) PCT No.: PCT/EP2016/061255
§ 371 (c)(1),
(2) Date: Dec. 13, 2017

(87) PCT Pub. No.: WO2016/202520
PCT Pub. Date: Dec. 22, 2016

(65) Prior Publication Data
US 2018/0180139 A1    Jun. 28, 2018

(30) Foreign Application Priority Data

Jun. 19, 2015   (DE) .................... 10 2015 211 367.1

(51) Int. Cl.
*F16H 3/38*   (2006.01)
*F16H 3/12*   (2006.01)
(Continued)

(52) U.S. Cl.
CPC .............. *F16H 3/12* (2013.01); *B60T 1/005* (2013.01); *B60T 1/062* (2013.01); *F16D 49/08* (2013.01);
(Continued)

(58) Field of Classification Search
CPC .... F16H 2003/123; F16H 63/345; F16H 3/12; F16H 61/04; F16H 2061/0411; B60T 1/005; B60T 1/062; F16D 49/08
See application file for complete search history.

(56) References Cited

U.S. PATENT DOCUMENTS 5,528,950 A   6/1996  Organek et al.
5,842,947 A   12/1998 Weilant
(Continued)

FOREIGN PATENT DOCUMENTS

CN   201255199 Y   6/2009
DE       597126 C   5/1934
(Continued)

OTHER PUBLICATIONS

German Search Report DE102015211367.1, dated Mar. 30, 2017. (12 pages).
International Search Report (English Translation) PCT/EP2016/061255, dated Jul. 27, 2016. (3 pages).

*Primary Examiner* — Jake Cook
(74) *Attorney, Agent, or Firm* — Dority & Manning, P.A.

(57) ABSTRACT

An automatic transmission (3) of a vehicle having a central synchronization device (8) with at least one shift element (33; 9, 10) assigned to a transmission input shaft (32; 6, 7) and being a friction locking brake, an actuating device (14) driven by supplying energy, and at least one transmission region (34; 12, 13) disposed between the brake and a transmission output shaft (30), an operative connection between the transmission input shaft and the transmission output shaft and different transmission ratios are producible (Continued)

over the at least one transmission region. The brake is transferable with the operative connection and the actuating device (14) into an operating state in which a transmission input shaft (6) interacting with the brake (33; 9, 10), is held in a rotationally fixed manner by the brake (33; 9, 10), wherein the brake (33; 9, 10) is held by the actuating (14) without any energy infeed.

14 Claims, 6 Drawing Sheets

(51) Int. Cl.
  *B60T 1/06* (2006.01)
  *B60T 1/00* (2006.01)
  *F16D 49/08* (2006.01)
  *F16H 61/04* (2006.01)
  *F16H 63/34* (2006.01)
(52) U.S. Cl.
  CPC ........... *F16H 61/04* (2013.01); *F16H 63/345* (2013.01); *F16H 2003/123* (2013.01); *F16H 2061/0411* (2013.01)

(56) References Cited

U.S. PATENT DOCUMENTS

| | | | |
|---|---|---|---|
| 2003/0047026 A1* | 3/2003 | Hoffmann | F16H 3/006 74/664 |
| 2010/0044183 A1* | 2/2010 | Guggolz | B60W 10/02 192/219 |
| 2011/0036187 A1 | 2/2011 | Reisch et al. | |
| 2011/0048150 A1 | 3/2011 | Dreibholz et al. | |
| 2011/0219900 A1* | 9/2011 | Schneider | B60W 10/30 74/473.1 |
| 2011/0224855 A1* | 9/2011 | Schneider | B60W 30/1888 701/22 |
| 2014/0076079 A1 | 3/2014 | Garabello et al. | |

FOREIGN PATENT DOCUMENTS

| | | |
|---|---|---|
| DE | 19627895 A1 | 2/1998 |
| DE | 102008000637 A1 | 9/2009 |
| DE | 102008000645 A1 | 9/2009 |
| DE | 102011006969 A1 | 10/2012 |
| EP | 2711588 A1 | 3/2014 |
| WO | WO 2012/136447 A1 | 10/2012 |

\* cited by examiner

AUTOMATIC TRANSMISSION OF A VEHICLE, COMPRISING A CENTRAL SYNCHRONIZING DEVICE, AND METHOD FOR OPERATING AN AUTOMATIC TRANSMISSION

FIELD OF THE INVENTION

The invention relates to an automatic transmission of a vehicle with a central synchronization device and a method for operating an automatic transmission.

BACKGROUND

The published document DE 10 2008 000 645 A1 discloses a dual clutch transmission in countershaft design for a vehicle having a so-called central synchronization. In order to decelerate each transmission part, a brake assembly is provided, wherein a band brake is the brake assembly. Furthermore, DE 10 2008 000 637 A1 discloses an actuating assembly of a centrally synchronized dual clutch transmission.

A parking brake function in automatic transmissions is usually implemented by mechanical parking brakes, each of the mechanical parking brakes produces a mechanical or rather positive locking connection between a transmission output and a transmission housing.

However, the parking brake systems, which are known from the prior art, are characterized by a highly sophisticated design and require considerable actuation effort. A high amount of effort is required to actuate a parking brake system due to the actuators that have to be employed, especially if there is no mechanical connection between a selector lever, which a driver can use, and the transmission.

In addition, parking brake systems, which lock the transmission output in a positive locking manner, have detectable and audible release jolts in the drive train, especially when disengaging a parking brake; and these release jolts impair the driving comfort to an undesired extent when a vehicle is parked on a slope with a steep gradient and secured against rolling away by the parking brake.

SUMMARY OF THE INVENTION

The object of the present invention is to provide an automatic transmission of a vehicle with a central synchronization device and a method for operating an automatic transmission, by which a parking brake function is provided in a structurally simple and space efficient way while at the same time providing a high level of driving comfort.

The inventive automatic transmission of a vehicle is provided with a central synchronization device, by which the rotational speed of at least one transmission input shaft is guidable to a synchronous speed level that corresponds to a requested transmission ratio. The central synchronization device has at least one shift element, which is assigned to the transmission input shaft, the at least one shift element is a friction locking brake and can reduce the rotational speed of the transmission input shaft. The brake is actuatable by an actuating device to synchronize the rotational speed of the transmission input shaft over a defined actuation path region, where the actuating device is drivable by an infeed of energy. At least one transmission region is disposed between the brake and the transmission output shaft, over which region different transmission ratios are representable and over which an operative connection is producible between the transmission input shaft and a transmission output shaft, the torque is guidable between the transmission input shaft and the transmission output shaft by the operative connection.

According to the invention, the brake is transferable, at least in the presence of an operative connection between the transmission input shaft and the transmission output shaft, by the actuating device associated with the brake, into an operating state, in which the transmission input shaft interacting with the brake is held in a rotationally fixed manner by the brake, and the brake is held in this operating state by the actuating device without any energy infeed.

As a result, it is possible to provide through the central synchronization device of the inventive automatic transmission, by which the respective torque is transferable between the transmission input shaft of the automatic transmission and a transmission housing, not only a synchronization function, which is to be carried out before a respective transmission ratio, but also the parking brake function, which is generated with low energy input and, compared to the solutions known from the field, in a much simpler way and with minimal actuating effort. In addition, with the solution in accordance with the present invention, a desired high level of driving comfort is attainable with hardly any effort, because the strain conditions, which may be generated in a vehicle drive train by activating the parking brake in a slope position of a vehicle when releasing the parking brake, which is implemented in the present case by a friction locking shift element, is reduced with much less steeper gradients and, as a result, avoids, without additional structurally complexity, the known release jolts when disengaging a parking brake.

In the automatic transmission in accordance with the invention, a force locking connection between the transmission output and the transmission housing is produced or maintained in the region of the central synchronization device when there is a request to engage the parking brake. For that request, a rotationally fixed connection between the transmission input shaft and a transmission output or, more specifically, the transmission output shaft is realizable in the transmission region connected to the transmission input shaft and in a rotationally fixed manner by the brake.

The inventive automatic transmission, which can also be a dual clutch transmission, can have both planetary gear units or spur gear stages in the transmission region or, more specifically, in transmission subregions, wherein the various transmission ratios or transmission ratio stages of the automatic transmission or, more specifically, a dual clutch transmission is engaged and disengaged in the transmission region or, more specifically, in transmission subregions by positive locking shift elements, such as claw shift elements or the like.

If the brake is supplied with a positioning force within the defined actuation path region, the positioning force acting in the direction of an operating state of the brake, the positioning force releases the transmission input shafts, then it is ensured that in the operating state that is not actuated by the actuating device, the brake will automatically pass into an open operating state and unwanted power losses in the region of the central synchronization device will be avoided with minimal open and closed loop control complexity.

In an advantageous further development of the automatic transmission in accordance with the invention, the at least one brake is supplied with a positioning force which acts in the direction of an operating state of the brake that holds the transmission input shaft and the transmission input shaft in a rotationally fixed manner, so that the parking brake function is actuatable or engaged or, more specifically, is held in an operating state in which the output is realized in a rotationally fixed manner without having to apply an actuating force or rather actuating energy permanently.

In one advantageous embodiment of the automatic transmission in accordance with the invention, the operating state of the at least one brake, which holds the transmission input shaft in a rotationally fixed manner, corresponds to a defined actuation path value of the brake, which is outside the defined actuation path region and spaced apart from it. This arrangement advantageously prevents the brake from passing into the operating region of the parking brake function when the brake is erroneously actuated due to unfavorable operating condition trends and from representing the transmission input shaft in a rotationally fixed manner to an undesired extent.

In easy-to-operate embodiments of the automatic transmission in accordance with the invention, the brake is in operative connection with an electrically, mechanically and/or fluidically drivable actuator unit of the actuating device.

If between the actuator unit and the brake there is a transfer device having a region in which a drive power of the actuator unit is convertible into an actuating force that actuates the brake, then the subject matter of the invention is easily implementable in already existing automatic transmissions or, more specifically, dual clutch transmission systems.

If the transfer device includes a mechanical stop, which corresponds to the defined actuation path value of the brake, then false actuations of the brake are avoided with minimal complexity in design.

In a structurally simple and cost-effective embodiment of the automatic transmission in accordance with the invention, the transfer device includes a toggle lever unit, which is present in an over dead-center position in the operating state of the brake that holds the transmission input shaft in a rotationally fixed manner.

As an alternative or in addition, the automatic transmission in accordance with the invention or its transfer device includes an eccentric unit, which is present in an over dead-center position in the operating state of the brake that holds the transmission input shaft in a rotationally fixed manner.

If the transfer device has a spindle-nut assembly and/or ball-ramp assembly, which is self-locking in an operating state that corresponds to the operating state of the brake that holds the transmission output shaft in a rotationally fixed manner, then the brake is actuatable in a structurally simple and robust manner, and the parking brake function is permanently provided without any energy input.

In the embodiment of the space-efficient and easy-to-actuate automatic transmission in accordance with the invention, the transfer device includes a sliding element, which is disposed in a displaceable manner in a lever element in the longitudinal extension of the lever element and which is in operative connection with the brake. In this case a braking power of the brake varies as a function of a displacement path of the sliding element, and a position of the sliding element relative to the lever element is changeable by pivoting the lever element about a fixed pivot point of the lever element and guiding the lever element along a cam track.

If the cam track has a track section, the sliding element abuts against the track section in a position corresponding to the operating state which holds the transmission input shaft in a rotationally fixed manner, and the sliding element is guided by the track section by applying a releasing force that acts in the direction of the open operating state of the brake, then the parking brake function is permanently provided with low power losses.

In a structurally simple and cost-effective embodiment of the automatic transmission in accordance with the invention, the brake is a band brake, and a free end of the brake band is connected to the actuating device.

At least one brake of the central synchronization device has a position, which is preferably closed when currentless, in order to generate the parking brake function. That means that the brake is held in the operating state, provided to generate the parking brake function, by the actuating device without having to apply any holding energy.

In addition, the brake of the central synchronization device is designed such that in the operating condition region of the brake that is provided to generate the synchronous function, the brake passes into its open operating state in the operating state that is not actuated by the actuating device and, as a result, has a so-called normally open function.

In a preferred embodiment of the automatic transmission in accordance with the invention, the operating condition region of the central synchronization device, or rather at least one brake, is followed by a safe operating condition region, which in turn is followed by the operating condition region in which the brake passes into the normally closed position, required to generate the parking brake function.

The central synchronization device may include disk brakes, clutch disks, drum brakes, lamellar shift elements, cones or band brakes.

The actuation of the central synchronization device or, more specifically, the operation of the brake of the central synchronization device is carried out, for example, by a non-constant force-travel ratio with additional locking effect in the end position, corresponding to the actuated parking brake, of at least one brake. For this purpose, it is possible to use, for example, an eccentric shaft having an over dead-center position, a toggle lever device having an over dead-center position, a mechanical flip-flop, such as a bistable rocker, or a mechanically stable support in the region of the cam ramp having an over dead-center region, as a support recess or the like.

The activation of the central synchronization device or, more specifically, the at least one brake, which is provided to generate the parking brake function, is carried out by an electric, pneumatic and/or hydraulic actuator. In this case there is, for example, the option of providing a magnet or an electric motor as the electric actuator, where in this case the electric motor is assignable, for example, a spindle or a pinion in order to operate the brake. Furthermore, it is also possible for the electric motor to be a self-locking actuator, which can be implemented, for example, by a spindle-nut combination with at least region-wise self-locking.

In the inventive method for operating an automatic transmission, in particular, an automatic transmission described in detail above, the rotational speed of a transmission input shaft is variable with a central synchronization device, the central synchronization device having at least one friction locking brake, and with varying the transfer ability of the brake. When there is a request to hold a transmission output shaft in a rotationally fixed manner, the transmission output shaft is coupled to the transmission input shaft, or an operative connection is maintained between the transmission output shaft and the transmission input shaft, and the transmission input shaft is held in a rotationally fixed manner by the brake.

Using the procedure of the invention, a parking brake function is implemented in a structurally simple and cost-effective manner with simultaneously hardly any actuating effort and with a low installation space requirement.

Not only the features disclosed in the patent claims, but also the features described in the following exemplary embodiments of the subject matter of the present invention are useful either alone or in any combination to further develop the subject matter of the invention.

BRIEF DESCRIPTION OF THE DRAWINGS

Other advantages and advantageous embodiments of the subject matter of the invention will become apparent from the patent claims and the exemplary embodiments described below, in principle, with reference to the drawings, and for the sake of clarity the same reference numerals are used for components that are structurally and functionally the same in the description of the various exemplary embodiments.

In the drawings the following is shown.

DETAILED DESCRIPTION

Figure 1:
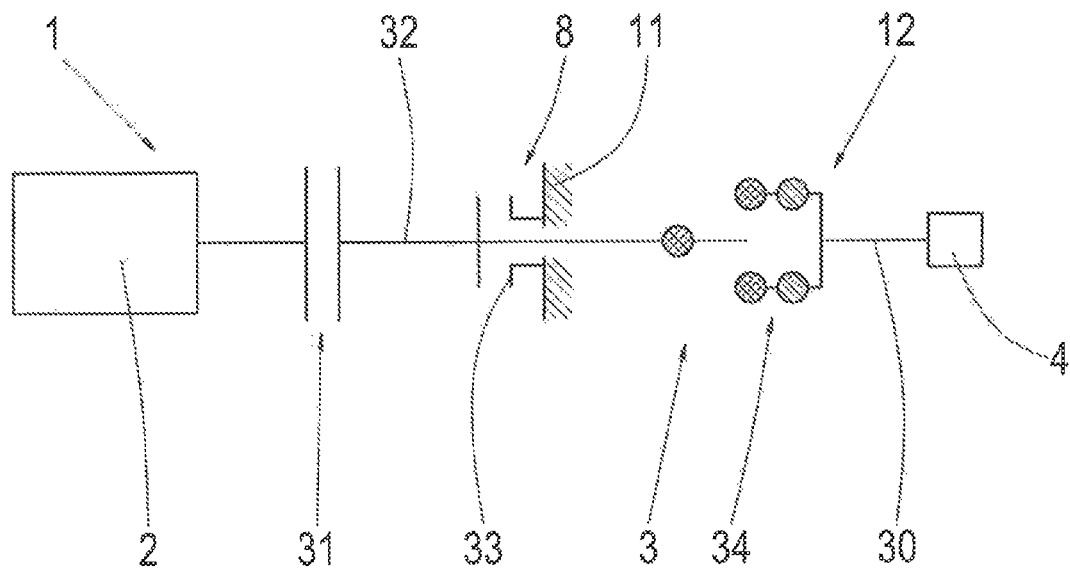
FIG. 1 shows in a highly schematic form a view of a vehicle drive train having a centrally synchronized automatic transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a vehicle drive train 1 with a driving machine 2, with an automatic transmission 3 and an output 4. The driving machine 2 is coupleable at the transmission input end to a transmission input shaft 32 by a clutch device 31 in a manner known from the prior art. The transmission input shaft 32 is assigned a central synchronization device 8; the central synchronization device 8 in this case includes a shift element 33, the shift element 33 being a friction locking brake. In this case the torque is transferable between the transmission input shaft 6 and a transmission housing 11 and is supportable in the region of the brake 33. Between the brake 33 and the output 4, connected to a transmission output shaft 30, there is provided a transmission region 34, over which various transmission ratios are engageable and disengageable by enabling and disenabling the positive locking shift elements, such as claw shift elements.

Depending on the respective current request for operating the vehicle drive train 1 with a transmission ratio that is generated over the transmission region 34, the positive locking shift elements, which are to be closed for this purpose, are transferred into the closed operating state in the transmission region 34 or left in the closed operating state, while the positive locking shift elements, to be transferred into the open operating state or to be held in it, are transferred into the open operating state or are left in the open operating state. Normally each requested transmission ratio is engaged in the load-free operating state of the transmission region 34 by selectively actuating the positive locking shift elements of the transmission region 34, and then the clutch device 31 is in the fully open operating state.

If a request is made to, for example, engage a transmission ratio that is to be generated over the transmission region 34, and if the vehicle drive train 1 or a vehicle equipped with said drive train is currently operated at a transmission ratio, which is engaged in the transmission region 34 and which corresponds to a lower gear than the requested gear to be engaged, then the current rotational speed of the transmission input shaft 32 is greater than the synchronous rotational speed of the transmission ratio to be engaged. Therefore, the transfer ability of the brake 33 is varied by an appropriate actuation until the rotational speeds of the shift element half, which is in operative connection with the output 4, of the positive locking shift element which is to be enabled in order to generate the requested transmission ratio, and the shift element half, which is in operative connection with the transmission input shaft 32, of the shift element which is to be enabled correspond more or less to each other, or between them there is a rotational speed difference that is conducive for enabling the positive locking shift elements. On reaching this operating state, the positive locking shift element is closed, and the requested gear is engaged to the desired extent.

In contrast, in order to carry out a requested transmission ratio change, for example, starting from a higher gear engaged in the transmission region 34 in the direction of a lower gear to be generated in the transmission region 34, it is necessary to raise the rotational speed of the transmission input shaft 32, which may be less than the synchronous rotational speed of the requested gear to be engaged, to a level that is suitable for closing the shift element that is to be enabled in the transmission region 12. In order to be able to raise the rotational speed of the transmission input shaft 6, to the extent required, to the level of the synchronous rotational speed of the transmission ratio to be engaged in the transmission region 34, the brake 9 is left in the completely open operating state, and the transfer ability of the clutch device 31 is raised accordingly until the two shift element halves of the positive locking shift element, to be enabled, of the transmission region 34 in turn have a differential rotational speed that is conducive for enabling the positive locking shift element. By engaging the requested transmission ratio in the transmission region 12, the shift operation in turn is completed.

In addition, it is also provided that at least one transmission ratio for reverse drive is generated in the transmission region 34.

In the present case, the brake 33 is transferable by way of an actuating device, associated with the brake, into an operating state in which the transmission input shaft 32, interacting with said brake, is held in a rotationally fixed manner by the brake 33. If, in addition, an operative connection between the transmission input shaft 32 and the transmission ratio, producing the output 4 is engaged or rather enabled in the transmission region 34, then when there is a request to generate the parking brake function, the output 4 is held in a rotationally fixed manner by the positive locking connection, which is produced in the region of the brake 33, between the output 4 and the transmission housing 11.

Figure 2:
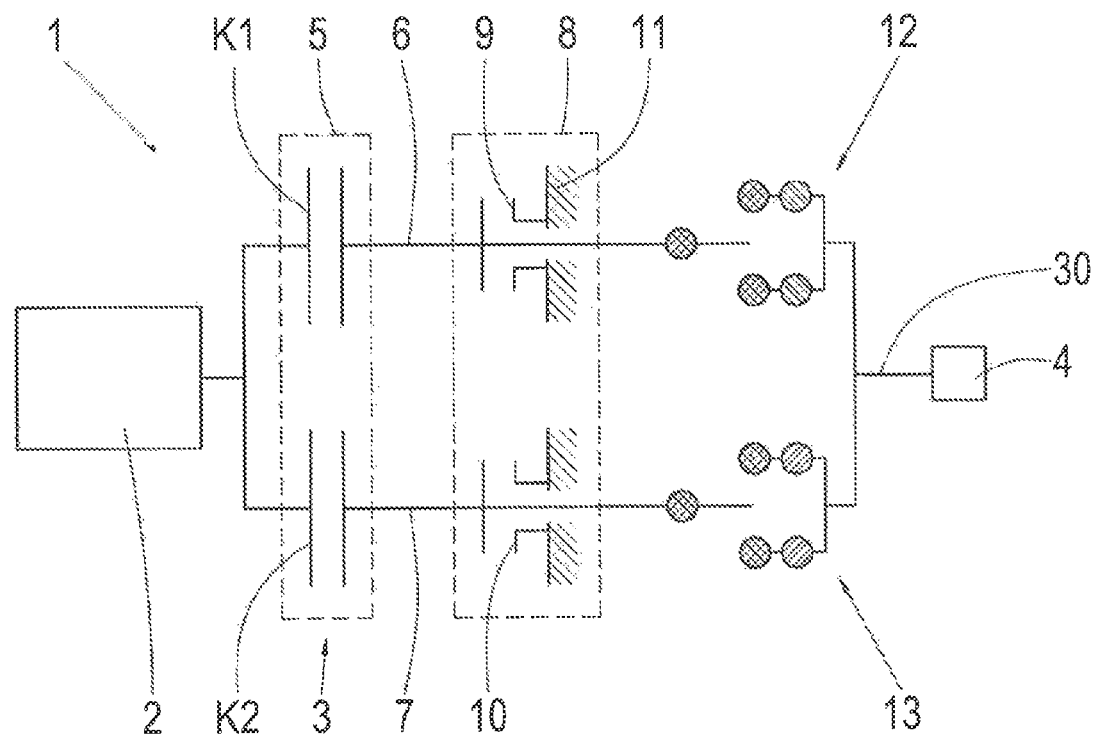
FIG. 2 shows in a highly schematic form a view of a vehicle drive train with a centrally synchronized dual clutch transmission.

FIG. 2 shows in a highly schematic form a view of a vehicle drive train 1 with a driving machine 2, with an automatic transmission 3, the automatic transmission being a dual clutch transmission, and an output 4. The driving machine 2 is coupleable at the transmission input end to two transmission input shafts 6, 7 by a dual clutch device 5 in a manner known from the prior art. The two transmission input shafts 6, 7 are assigned a central synchronization device 8, which in this case includes two shift elements 9, 10, which are friction locking brakes. In this case the torque is transferable between the transmission input shaft 6 and a transmission housing 11 and is supportable in the region of the brake 9, while the torque is transferable between the transmission input shaft 7 and the transmission housing 11 in the region of the brake 10. Between the brakes 9 and 10 and the output 4 there are provided two transmission subregions 12, 13, and in each of these regions various transmission ratios are engageable and disengageable by enabling and disabling the positive locking shift elements, such as claw shift elements.

Depending on the respective current request for operating the vehicle drive train 1 with a transmission ratio that is generated over the transmission subregion 12 or the transmission subregion 13, the positive locking shift elements, which are to be closed for this purpose, are transferred into the closed operating state in the region of the transmission subregion 12 or 13 or are left in the closed operating state, while the positive locking shift elements, to be transferred into the open operating state or to be held in the open operating state, are transferred into the open operating state or are left in the open operating state. Normally each requested transmission ratio is prepared in the load-free operating state of the transmission subregion 12 or 13 by selectively actuating the positive locking shift elements of the transmission subregion 12 or 13, as a result of which the respective associated clutch K1 or K2 is then in the fully open operating state.

If a request is made to, for example, engage a transmission ratio that is to be generated over the transmission subregion 12, and if the vehicle drive train 1 or a vehicle, equipped with said drive train, is currently operated at a transmission ratio which is engaged in the transmission subregion 13 and which corresponds to a lower gear than the requested gear to be engaged, then the current rotational speed of the transmission input shaft 6 is greater than the synchronous rotational speed of the transmission ratio to be engaged. Therefore, the transfer ability of the brake 9 is varied by an appropriate actuation until the rotational speeds of the shift element half, which is in operative connection with the output 4, of the positive locking shift element, which is to be enabled in order to generate the requested transmission ratio, and the shift element half, which is in operative connection with the transmission input shaft 6, of the shift element which is to be enabled, correspond more or less to each other or between them there is a rotational speed difference that is conducive for enabling the positive locking shift element.

On reaching this operating state, the positive locking shift element is closed and, as a result, the power path of the dual clutch transmission 3 that includes the transmission subregion 12 is prepared for generating the requested gear to the requested extent. Then a load transfer, starting from the friction locking clutch K2, is carried out in a manner known from the prior art in the direction of the friction locking clutch K1 of the dual clutch system 5, so that at the end of the load transfer the requested shift operation in the dual clutch transmission 3 is completed.

In contrast, in order to carry out a requested transmission ratio change, for example, starting from a higher gear engaged in the transmission subregion 13 in the direction of a lower gear to be generated in the transmission subregion 12, it is necessary to raise the rotational speed of the transmission input shaft 6, which may be less than the synchronous rotational speed of the requested gear to be engaged, to a level that is suitable for closing the shift element that is to be enabled in the transmission subregion 12. In order to be able to raise the rotational speed of the transmission input shaft 6, to the extent required, to the level of the synchronous rotational speed of the transmission ratio, to be engaged in the transmission subregion 12, the brake 9 is left in the completely open operating state, and the transfer ability of the friction locking clutch K1 is raised accordingly, until the two shift element halves of the positive locking shift element, to be enabled, of the transmission subregion 12 in turn have a differential rotational speed that is conducive for enabling the positive locking shift element. By engaging the requested transmission ratio in the transmission subregion 12, the load transfer, starting from the shift element K2, is carried out, in turn, in the direction of the shift element K1, until finally the torque is guidable between the driving machine 2 and the output 4 through the shift element K1 and the transmission subregion 12, while the power path having the friction locking shift element K2 and the transmission subregion 13 of the dual clutch transmission 3 is more or less in the disabled operating state.

If the transmission subregion 12 is enabled in the force flow of the dual clutch transmission 3 and if there is a request to engage a higher or lower gear in the transmission subregion 13, then the positive locking shift elements, which are to be enabled in the transmission subregion 13, are transferred to the prescribed extent into an operating state, which is conducive for enabling the positive locking shift elements, by selectively actuating the brake 10 or the friction locking clutch K2, and then said positive locking shift elements are closed. Then immediately thereafter, the load transfer by the friction locking shift element K1 takes place in the direction of the friction locking shift element K2 of the dual clutch system 5.

In addition, it is also provided that at least one transmission ratio for reverse drive is generated in either the transmission subregion 12 or in the transmission subregion 13. At variance with the aforesaid, there is also the possibility that a transmission ratio for reverse drive is generated in both the transmission subregion 12 and also in the transmission subregion 13.

In the present case, the brake 9 in turn is transferable by way of an actuating device, associated with the brake, into an operating state, in which the transmission input shaft 6, interacting with said brake, is held in a rotationally fixed manner by the brake 9. If, in addition, an operative connection between the transmission input shaft 6 and the transmission ratio, producing the output 4, is engaged or enabled in the transmission subregion 12, then when there is a request to generate the parking brake function, the output 4 is held in a rotationally fixed manner by the force locking connection, which is produced in the region of the brake 9, between the output 4 and the transmission housing 11.

Of course, there is also the possibility of providing the parking brake function by the brake 10 or by both the brake 9 and also the brake 10 of the central synchronization device 8.

FIG. 3 to FIG. 12 show in schematic form three different embodiments of an actuating device 14, which in the present case is assigned to the brake 33 or 9, and by which the brake 33 or 9 is actuatable to synchronize the rotational speed of the transmission input shaft 32 or 6 and, in addition, to generate the parking brake function. In the following description, the way in which the actuating device 14 works is described for the sake of clarity only with reference to the brake 9 of the automatic transmission 3 of the vehicle drive train in accordance with FIG. 2.

Figure 3:
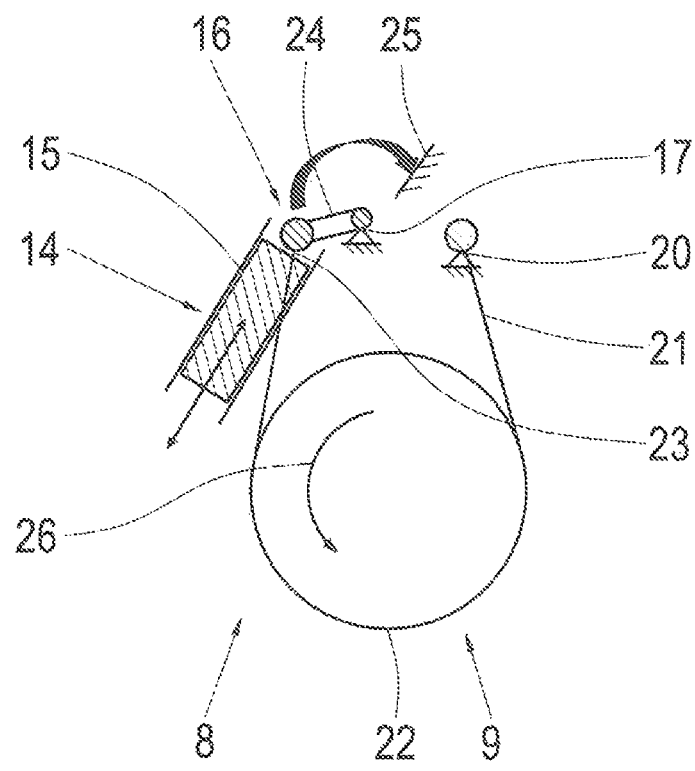
FIG. 3 shows in a highly schematic form a view of a brake, the brake being a band brake, of a central synchronization device of the automatic transmission in accordance with FIG. 1 or a dual clutch transmission in accordance with FIG. 2 with a first embodiment of an actuating device of the brake in the open operating state of the brake.
Figure 4:
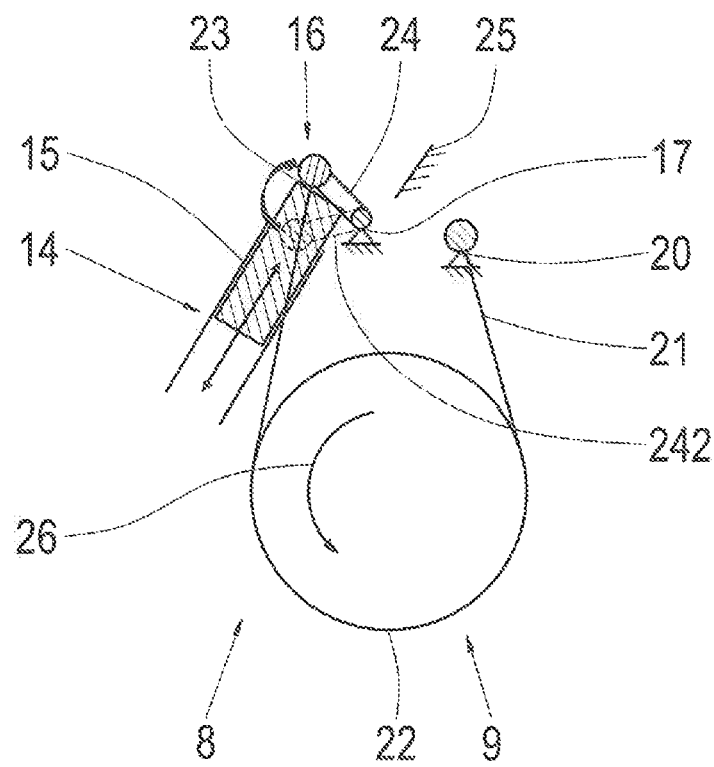
FIG. 4 shows a view corresponding to that shown in FIG. 3 of the brake, which is actuated by the actuating device for synchronization of the rotational speed of a transmission input shaft within a defined actuation path region.
Figure 5:
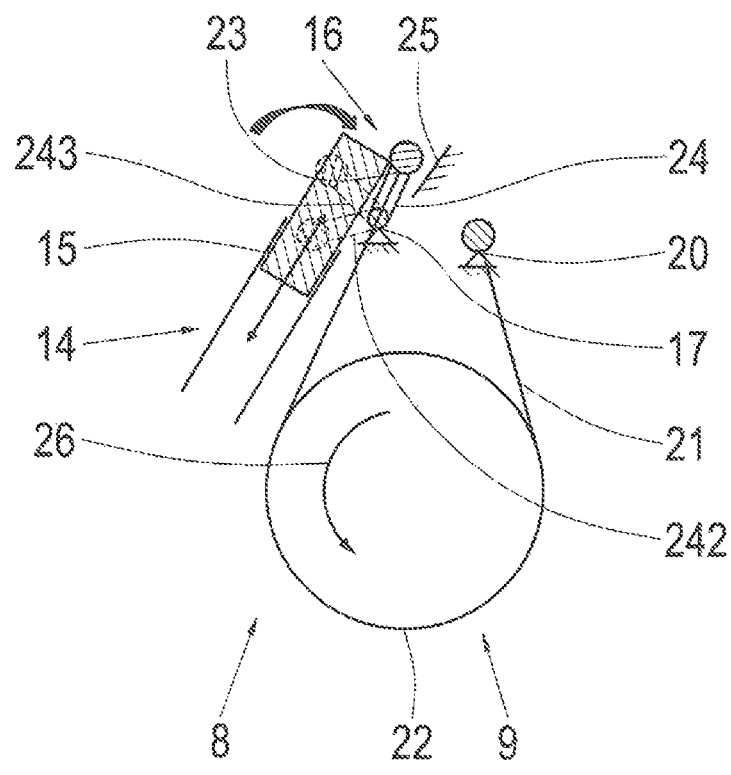
FIG. 5 shows the actuating device in accordance with FIG. 3 in a so-called dead-center position.
Figure 6:
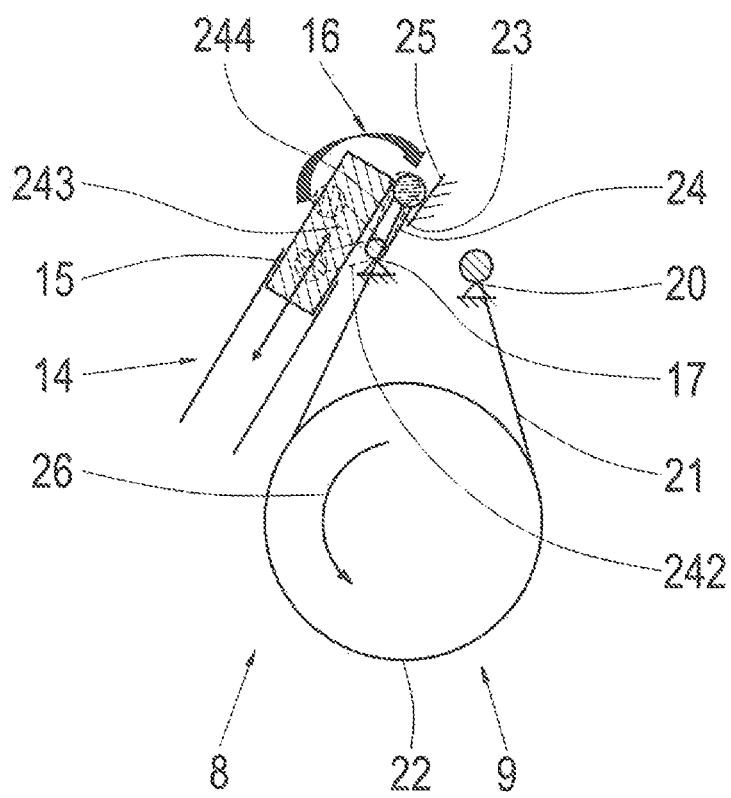
FIG. 6 shows the actuating device in a view that corresponds to that shown in FIG. 3, in a so-called over dead-center position, in which a parking brake function is permanently generated by the brake.
Figure 10:
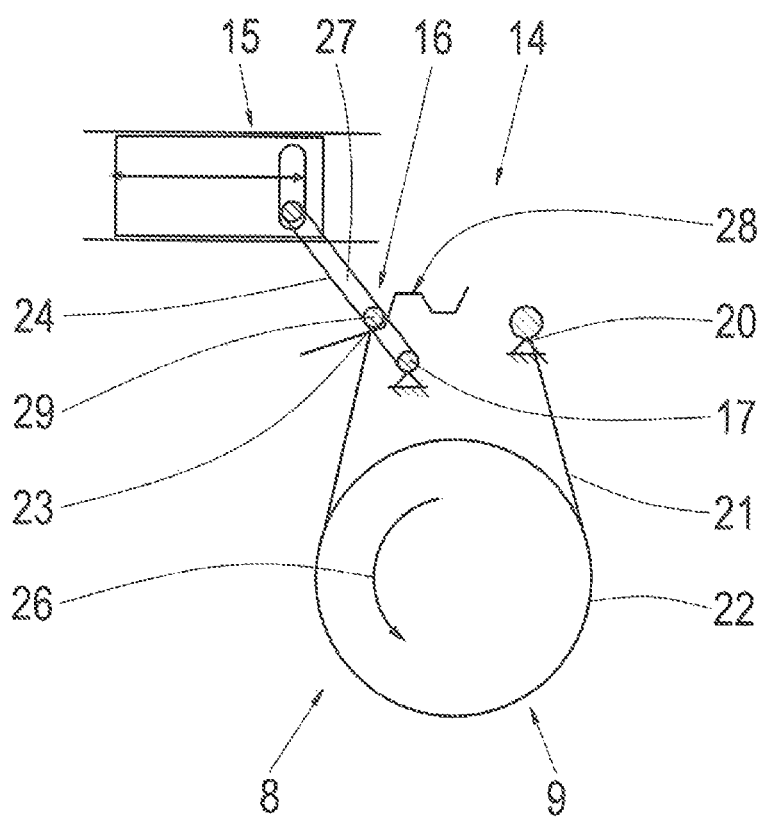
FIG. 10 shows a view that corresponds to that shown in FIG. 3 and that shows a third embodiment of the actuating device when the brake is open.
Figure 11:
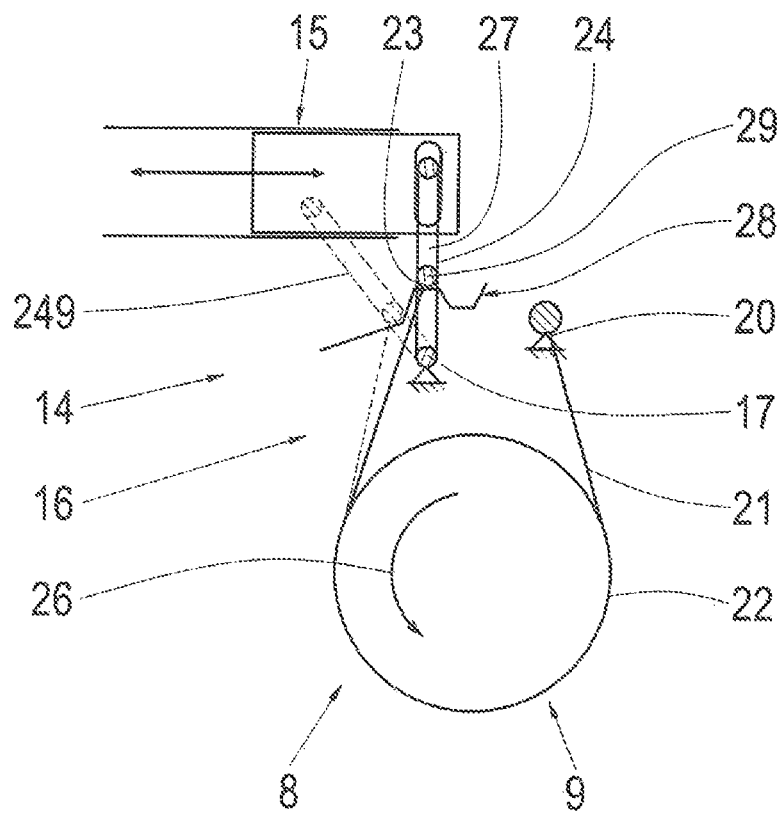
FIG. 11 shows the actuating device in accordance with FIG. 10 in its dead-center position.

In FIG. 4 to FIG. 6, respectively, the pivotal positions of a lever element 24, shown in the preceding FIG. 3 to FIG. 5, are shown graphically with dashed lines and with the reference numerals 242, 243, 244 and 245. Furthermore, FIG. 8 and FIG. 9 show in each case the pivotal positions of the lever element 24, shown in the preceding FIG. 7 and FIG. 8, with the reference numerals 246 and 247, respectively, while in FIG. 11 and FIG. 12, respectively, the pivotal positions of the lever element 24, shown in the preceding FIG. 10 and FIG. 11, are shown with the reference numerals 249 and 2410, respectively.

In this context, the brake 9 is held by the actuating device 14 in the actuated operating state of the parking brake function without applying an actuation energy. In addition, the brake 9 in its synchronization operating region has a normally open function, for which reason the brake 9 passes into its fully open operating state without corresponding actuation by the actuating device 14.

As a result, starting from its fully open operating state, the brake 9 is actuated, when suitably requested, by the actuating device 14, and the transfer ability of the brake 9 for the synchronization of the rotational speed of the transmission input shaft 6 is raised or rather adjusted, as required. The brake 9 is actuated by the actuating device 14 in a defined actuation direction. If there is a request to engage the parking brake or to generate the parking brake function, then the brake 9 is actuated by the actuating device 14 to the same extent as the raising of the transfer ability during generation of the synchronization function. The transfer ability of the brake 9 increases accordingly due to the actuation by the actuating device 14, and this actuation is carried out then over the defined actuation path region provided for synchronizing the rotational speed of the transmission input shaft 6.

Then the defined actuation path region of the brake 9 is followed by a so-called safe operating region of the brake 9, which in turn is followed by the actuation operating region of the brake 9 that is provided for generating the parking brake function. At the end of the operating region of the parking brake function, the brake 9 or the actuating device 14 remains in the operating state corresponding to the actuated operating state of the parking brake, because the brake 9 has a so-called normally closed function in order to avoid an automatic opening of the brake 9 and, thus, to avoid an unwanted disengagement of the parking brake.

In the embodiments of the actuating device 14, shown in FIG. 3 to FIG. 12, the brake 9 is in each case a band brake. Depending on the particular application in each case, there is also the possibility that the brake 9 is a disk brake, clutch disk, drum brake, lamellar shift element, cone or the like.

In this case, one end 20 of a brake band 21 of the brake 9, the brake 9 being a band brake, is fastened stationary or rather is not displaceable in the region of the transmission housing 11. In the present case, the brake band 21 loops around a brake drum 22, the brake drum 22 is connected in a rotationally fixed manner to the transmission input shaft 6, and is permanently connected to a lever element 24, which is pivotable about the stationary pivot point 17, in the region of its second end 23.

In all of the embodiments of the actuating device 14 shown in the drawings, the brake 9 is generally actuated by said actuating device at a non-constant force-travel ratio with a corresponding locking effect in the operating state of the actuating device 14 that corresponds to the actuated operating state of the parking brake function. In addition, the actuating devices 14, in accordance with FIG. 3 to FIG. 12, have in each case an electrically, mechanically and/or fluidically drivable actuator unit 15, which is in operative connection with the brake 9 by a transfer device 16. In the region of the transfer device 16, a drive power of the actuator unit 15 is convertible into an actuating force, actuating the brake 9.

Figure 7:
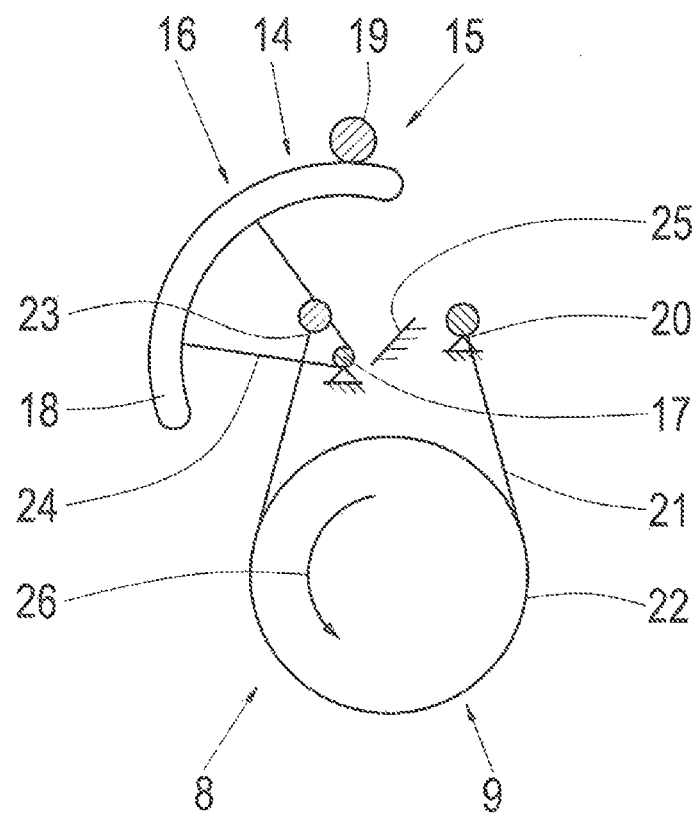
FIG. 7 shows a view that corresponds to that shown in FIG. 3 and that shows a second embodiment of the actuating device when the brake is open.
Figure 8:
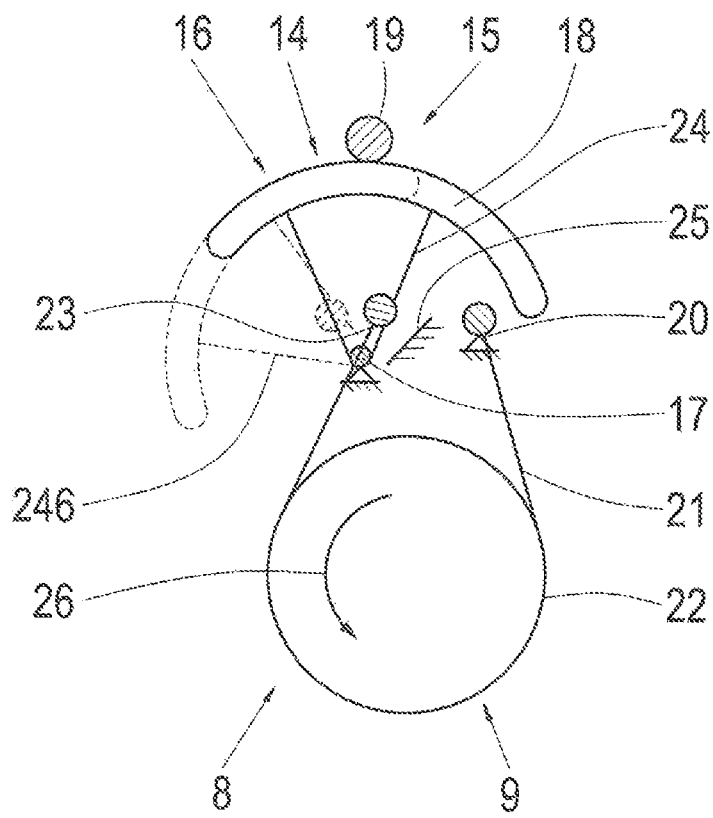
FIG. 8 shows the actuating device in accordance with FIG. 7 in its dead-center position.
Figure 9:
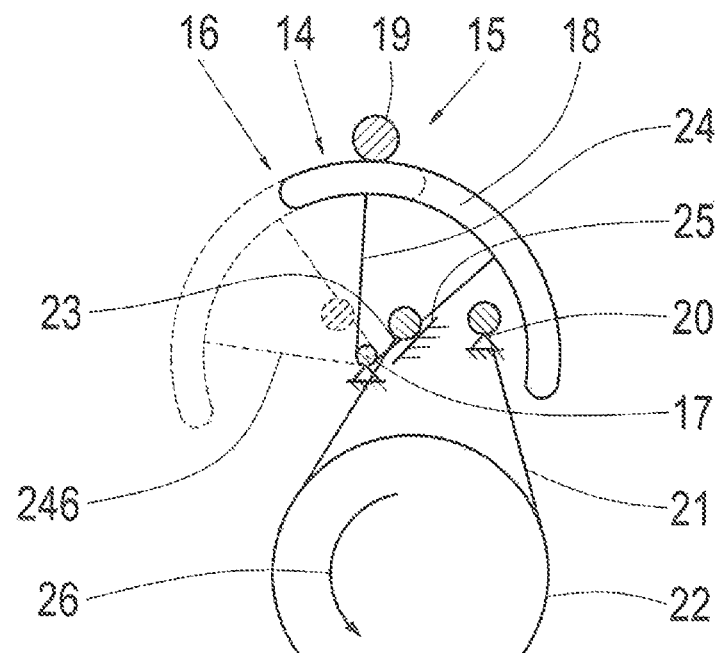
FIG. 9 shows the actuating device in accordance with FIG. 7 in its over dead-center position and at the same time with the parking brake function permanently actuated.

The first embodiment of the actuating device 14 shown in FIG. 3 to FIG. 6 and the second embodiment of the actuating device 14 shown in FIG. 7 to FIG. 9 have in each case a transfer device 16, the transfer device 16 being a toggle lever. The actuator 15 of the actuating device 14 is in accordance with FIG. 3 to FIG. 6 and is a piston-cylinder unit or a screw-nut assembly, while the transfer device 16 of the second embodiment of the actuating device 14 in accordance with FIG. 7 to FIG. 9 includes a gear segment 18, the gear segment 18 allowing rotation about a stationary pivot point 17 and which meshes with an actuator pinion 19. The actuator pinion 19 in turn is connected in a rotationally fixed manner to an output shaft of an electric motor (not shown in detail) of the actuator unit 15.

In the pivot position of the lever element 24 shown in FIG. 3, the brake 9 is in the completely opened operating state. If a synchronization of the rotational speed of the transmission input shaft 6 is requested by the brake 9, then the lever element 24 is pivoted out of the pivot position, shown in FIG. 3, by a corresponding actuation of the actuator unit 15, for example, into the pivot position, shown in FIG. 4, and the distance between the end 23 of the brake band 21 and brake drum 22 is increased, so that the transfer ability of the brake 9 increases to the desired extent, and the rotational speed of the transmission input shaft 6 is reduced with a corresponding braking power of the brake 9.

If there is a request to generate the parking brake function, then the lever element 24 is actuated by the actuator unit 15 beyond the defined actuation path region of the synchronization function, until the lever element reaches a dead-center position, shown in FIG. 5, in which the parking brake function is already actuated. In order to be able to hold the parking brake function in an actuated operating state without applying any holding energy, the lever element 24 is actuated by the actuator unit 15 to the extent, shown in FIG. 6, beyond the dead-center position, shown in FIG. 5, until the lever element 24 has reached the over dead-center position, shown in FIG. 6; and then the lever element abuts the region in which the lever element 24 is connected to the second end 23 of the brake band 21, at a mechanical stop 25, and assumes a stable pivot position.

In the present case, the stable pivot position is ensured in a simple manner in that the lever element 24 is pressed against the mechanical stop 25 by the tensile force of the brake band 21 acting on the lever element 24. If there is a corresponding request to deactivate the parking brake function, then the lever element 25 is guided again out of the over dead-center position by the actuator unit 15, wherein for which purpose, for example, a corresponding operative connection between the actuator unit 15 and the lever element 24 is implementable, for example, in the form of a rear latching or by a spring bias.

If the lever element 24 has reached or has already exceeded the dead-center position, then the brake 9 in turn automatically passes into its open operating condition, owing to the tensile force of the brake band 21 acting on the lever element 24. In any case, this circumstance is ensured when the transmission input shaft 6 and the brake drum 22, which is operatively connected thereto, has a direction of rotation which corresponds to the arrow 26 and which causes a self-attenuating effect of the transfer ability of the band brake 9. In contrast, an opposite direction of rotation of the transmission input shaft 6 and the brake drum 22, which is operatively connected thereto, creates a self-reinforcing effect of the transfer ability of the brake 9, for which reason then in order to open the brake 9, there has to be a solution in terms of a suitable design, for example, a spring assembly or the like, by which, on reaching the dead-center position, an automatic opening of the brake 9 is ensured.

In the case of the embodiment of the actuating device 14 in accordance with FIG. 7 to FIG. 9, FIG. 8 shows the lever element 24 in its dead-center position, while the lever element 24 in FIG. 9 is shown in its over dead-center position. Since, in addition, the actuating device 14 in accordance with FIG. 7 to FIG. 9 has in essence the same function as the actuating device 14, shown in FIG. 3 to FIG. 6, with respect to the rest of the operating mode of the actuating device 14 in accordance with FIG. 7 to FIG. 9, reference is made to the above description in conjunction with FIG. 3 to FIG. 6.

Figure 12:
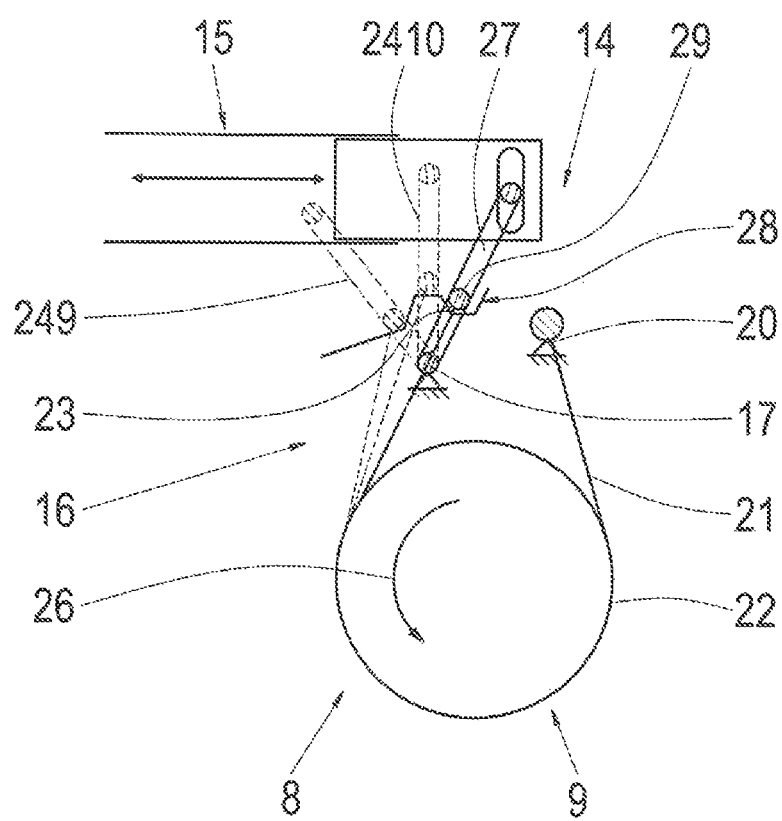
FIG. 12 shows the actuating device in accordance with FIG. 10 in its over dead-center position with at the same time the parking brake function permanently actuated.

The third embodiment of the actuating device 14, in accordance with FIG. 10 to FIG. 12, also has an operating mode that corresponds to that of the actuating device 14, in accordance with FIG. 3 to FIG. 6, but in a different design. Therefore, the following description in turn focuses in essence only on the differences between the actuating device 14, in accordance with FIG. 10 to FIG. 12, and the actuating device 14, in accordance with FIG. 3 to FIG. 6, and with respect to the additional mode of operation, reference is made to the above description in conjunction with FIG. 3 to FIG. 6.

The actuating device 14, in accordance with FIG. 10 to FIG. 12, includes in turn an actuator unit 15 and a lever element 24, which is pivotable about the stationary pivot point 17. In contrast to the two embodiments of the actuating device 14 described above, the second end 23 of the brake band 21 between the end of the lever element 24, which is connected to the stationary pivot point 17, and the end of the lever element 24, which is operatively connected to the actuator unit 15 and which is arranged in a link 27 longitudinally displaceable in the lever element 24 or is operatively connected to said lever element, is coupled to said lever element so as to be displaceable relative to the lever element 24.

Starting from the operating state, shown in FIG. 10, of the actuating device 14 and the brake 9, which is in the open operating state, an actuation movement of the actuator unit 15, starting from the operating state shown in FIG. 10, in the direction of the operating state shown in FIG. 11, causes a pivot movement of the lever element 24 about the stationary pivot point 17. The second end 23 of the brake band 21 rests against a cam track or, more specifically, a cam 28, and is adjusted to conform to the contour of the cam track 28 during the pivot movement of the lever element 24. In the position of the second end 23 of the brake band 21 shown in FIG. 11, the transfer device 16 in turn is located in its dead-center position or, more specifically, in the safe operating region, which adjoins the actuating region of the actuating device 14, within which the brake 9 for synchronizing the rotational speed of the transmission input shaft 6 is operated correspondingly by the actuating device 14.

As the actuation movement of the actuator unit 15 increases and, as a result, the actuation movement of the lever element 24 also increases, the second end 23 or rather the sliding element 29, which interacts with said second end, is passed, in conformity with the contour of the cam 28, into the over dead-center position, shown in FIG. 12, and in turn is securely held by the tensile force of the brake band 21, in which the parking brake function is permanently in an actuated state without any additional actuating force. In order to deactivate the parking brake function, the second end 23 of the brake band 21 or rather the sliding element 29 in turn is passed by an actuator-sided actuation out of the over dead-center position in the direction of the dead-center position and starting from there in the direction of the defined actuation path region, and just after crossing the dead-center region, the brake 9 goes automatically into its open operating state, when the brake 9 is no longer actuated by the actuating device 14.

Modifications and variations can be made to the embodiments illustrated or described herein without departing from the scope and spirit of the invention as set forth in the appended claims.

REFERENCE NUMERALS 1 vehicle drive train
2 driving machine
3 automatic transmission, dual clutch transmission
4 output
5 dual clutch system
6 transmission input shaft
7 transmission input shaft
8 central synchronization device
9 shift element, brake
10 shift element, brake
11 transmission housing
12 transmission subregion
13 transmission subregion
14 actuating device
15 actuator unit
16 transfer device
17 stationary pivot point
18 gear segment
19 actuator pinion
20 end of the brake band 21 brake band
22 brake drum
23 second end of the brake band
24 lever element
25 mechanical stop
26 direction of rotation
27 link of the lever element
28 cam, cam track
29 sliding element
30 transmission output shaft
31 clutch device
32 transmission input shaft
33 shift element, brake
34 transmission region
242 to 2410 lever element
K1, K2 clutch

The invention claimed is:

1. An automatic transmission (3) of a vehicle, the automatic transmission (3) comprising:
   a transmission input shaft (32; 6, 7);
   a transmission output shaft (30); and
   a central synchronization device (8), the central synchronization device (8) guiding a rotational speed of the transmission input shaft (32; 6, 7) to a synchronous rotational speed level corresponding to a requested transmission ratio, the central synchronization device (8) comprising,
      a shift element (33; 9, 10), the shift element (33; 9, 10) is assigned to the transmission input shaft (32; 6, 7) and is a friction locking brake, the rotational speed of the transmission input shaft (32; 6, 7) reducible by the friction locking brake,
      an actuating device (14), the actuating device (14) being driven by supplying energy, the brake (33; 9, 10) being actuatable by the actuating device (14), the actuating device (14) synchronizing the rotational speed of the transmission input shaft (32; 6, 7) over a defined actuation path region, and
      a transmission region (34; 12, 13), the transmission region (34; 12, 13) is disposed between the brake (33; 9, 10) and the transmission output shaft (30), different transmission ratios are representable and an operative connection is producible between the transmission input shaft (32; 6, 7) and the transmission output shaft (30) over the transmission region (34; 12, 13), the operative connection guiding torque between the transmission input shaft (32; 6, 7) and the transmission output shaft (30),
      wherein, at least when there is the operative connection, the brake (33; 9, 10) is transferable by the actuating device (14) into an operating state in which the transmission input shaft (32; 6, 7) is held in a rotationally fixed manner by the brake (33; 9, 10), wherein the brake (33; 9, 10) is held in the operating state by the actuating device (14) without any energy infeed.

2. The automatic transmission of claim 1, wherein, when the brake (33; 9, 10) is supplied with a positioning force within the defined actuation path region, the positioning force acts in the direction of an operating state of the brake that releases the transmission input shaft (32; 6, 7).

3. The automatic transmission of claim 1, wherein, when the brake (33; 9, 10) is in the operating state of the brake (33; 9, 10) that holds the transmission input shaft (6) in the rotationally fixed manner, the brake (33; 9, 10) is supplied with a positioning force that acts in the direction of the operating state of the brake (33; 9, 10) that holds the transmission input shaft (6) in the rotationally fixed manner.

4. The automatic transmission of claim 1, wherein the operating state of the brake that holds the transmission input shaft (6) in the rotationally fixed manner corresponds to a defined actuation path value of the brake (33; 9, 10), and the defined actuation path value of the brake (33; 9, 10) lies outside the defined actuation path region and is spaced apart therefrom.

5. The automatic transmission of claim 4, wherein the actuating device (14) comprises a drivable actuator unit (15), the drivable actuator unit (15) is one or more of electrically, mechanically and fluidically driven, and the brake (9) is in operative connection with the drivable actuator unit (15).

6. The automatic transmission of claim 5, further comprising a transfer device (16) provided between the actuator unit (15) and the brake (9), the transfer device (16) having a region in which a drive power of the actuator unit (15) is convertible into the positioning force for actuating the brake (9).

7. The automatic transmission of claim 6, wherein the transfer device (16) comprises a mechanical stop (25), and the mechanical stop (25) corresponds to the defined actuation path value of the brake (9).

8. The automatic transmission of claim 6, wherein the transfer device (16) comprises a toggle lever unit, and the toggle lever unit is in an over dead-center position in the operating state of the brake (9) that holds the transmission input shaft (6) in the rotationally fixed manner.

9. The automatic transmission of claim 6, wherein the transfer device (16) comprises an eccentric unit, the eccentric unit in an over dead-center position in the operating state of the brake (9) that holds the transmission input shaft (6) in the rotationally fixed manner.

10. The automatic transmission of claim 6, wherein:
    the transfer device (16) comprises one or more of a screw-nut assembly and a ball-ramp assembly; and
    the screw-nut assembly and the ball-ramp assembly are self-locking in the operating state of the brake (9) that holds the transmission output shaft (30) in the rotationally fixed manner.

11. The automatic transmission of claim 6, wherein:
    the transfer device (16) comprises a sliding element (29), the sliding element (29) is disposed in a displaceable manner in a longitudinal extension of a lever element (24), and is in operative connection with the brake (9);
    a braking power of the brake (9) varies as a function of a displacement path of the sliding element (29); and
    a position of the sliding element (29) relative to the lever element (24) is changeable by pivoting the lever element (24) about a fixed pivot point (17) of the lever element (24) and by guiding the lever element (24) along a cam track (18).

12. The automatic transmission of claim 11, wherein the cam track (28) has a track section, the sliding element (29) abuts the track section in a position corresponding to the operating state of the brake which holds the transmission input shaft (32; 6, 7) in the rotationally fixed manner, the track section guiding the sliding element (29) by applying a releasing force that acts in the direction of the open operating state of the brake (33; 9, 10).

13. The automatic transmission of claim 1, wherein the brake (9) is a band brake, and wherein a free end (23) of a brake band (21) is connected to the actuating device (14).

14. A method for operating the automatic transmission (3) of claim 1, the automatic transmission (3) having the central synchronization device (8), the central synchronization device (8) comprising the friction locking brake (33; 9, 10), wherein varying a transfer ability of the brake (33; 9, 10) varies a rotational speed of the transmission input shaft (6, 7), the method comprising:

after a request to hold the transmission output shaft (30) in the rotationally fixed manner, coupling the transmission output shaft (30) to the transmission input shaft (32; 6, 7) or maintaining the operative connection between the transmission output shaft (30) and the transmission input shaft (32; 6, 7); and holding the transmission input shaft (32; 6, 7) by the brake (33; 9, 10) in the rotationally fixed manner.

\* \* \* \* \*